(12) United States Patent
Athayde

(10) Patent No.: US 8,296,251 B1
(45) Date of Patent: Oct. 23, 2012

(54) METHOD AND APPARATUS FOR GENERATING COLLECTIVE INTELLIGENCE TO AUTOMATE RESOURCE RECOMMENDATIONS FOR IMPROVING A COMPUTER

(75) Inventor: Roy Savio Athayde, Pune (IN)

(73) Assignee: Symantec Corporation, Mountain View, CA (US)

( * ) Notice: Subject to any disclaimer, the term of this patent is extended or adjusted under 35 U.S.C. 154(b) by 646 days.

(21) Appl. No.: 12/483,308

(22) Filed: Jun. 12, 2009

(51) Int. Cl.
*G06F 17/00* (2006.01)
*G06F 3/00* (2006.01)
*G06F 9/00* (2006.01)
*G06F 7/00* (2006.01)

(52) U.S. Cl. .................. 706/45; 710/8; 713/1; 713/100; 707/705

(58) Field of Classification Search .................. None
See application file for complete search history.

(56) References Cited

U.S. PATENT DOCUMENTS

2005/0222819 A1\* 10/2005 Boss et al. .................... 702/186

OTHER PUBLICATIONS

Ohsugi, Naoki, "A Recommendation System for Software Function Discovery," International Workshop on Community-Driven Evolution of Knowledge Artifacts, Dec. 16, 2003, pp. 1-14.

\* cited by examiner

*Primary Examiner* — Alan Chen
(74) *Attorney, Agent, or Firm* — Campbell Stephenson LLP

(57) ABSTRACT

A method for generating collective intelligence in order to automate resource recommendations for improving a computer is disclosed. In one embodiment, the method for generating, using at least one processor, collective intelligence in memory in order to recommend a resource for improving a computer comprises accessing configuration data associated with various resources at a plurality of computers, identifying usage patterns, based on the configuration data, associated with the various resources, wherein the identified usage patterns indicate at least one related resource for at least one resource of the various resources and determining a resource of the at least one related resource to utilize at a computer based on the identified usage patterns.

20 Claims, 5 Drawing Sheets

METHOD AND APPARATUS FOR GENERATING COLLECTIVE INTELLIGENCE TO AUTOMATE RESOURCE RECOMMENDATIONS FOR IMPROVING A COMPUTER

BACKGROUND

1. Field of the Invention

Embodiments of the present invention generally relate to cloud computing based systems and services and, more particularly, to a method and apparatus for generating a collective intelligence database in order to recommend a resource for improving a computer and/or user experience.

2. Description of the Related Art

Because of the advancement of computer-based technologies, it is desirable to achieve high performance. Computers perform various day-to-day-operations, such as communicating with other people (e.g., through Instant Messages (IM) and emails), conducting research (e.g., through educational websites, digital libraries and expert discussion forums), playing online games and/or watching movies, performing business applications, performing online transactions (e.g., online securities trading and bank account management and/or the like). Computer resources, such as, hardware devices (e.g., a RAM, a Network Interface Card (NIC), a graphic card and/or the like) and/or software programs (e.g., operating system, device drivers, and/or the like), must be optimally configured to achieve such high performance in a secure environment.

For example, computer gaming software may operate optimally with certain computer graphics adaptors. Hence, it is desirable to install and/or configure these computer graphic adaptors. As another example, the user may install an operating system that requires a minimum of two Giga Bytes (GB) of memory (i.e., RAM), but there may be only one GB of available memory on the computer. Increasing the amount of available memory by one GB or two GB should enhance the stability and performance of the computer and/or user experience.

Generally, the hardware devices and/or software programs are manually configured and/or installed by the user and/or an administrator. Unfortunately, this is difficult, error prone and a tedious procedure. Manual configuration of the hardware devices and/or software programs consumes valuable time and resources. The administrator is unable to advise the user regarding specific hardware device and/or software programs to install. Such advice may be based on information (e.g., data regarding hardware devices, software programs and/or the like) that is provided by a plurality of computer users. Such information, however, is either not available or unknown. As a result, optimal configuration and/or installation of the hardware devices and/or the choice of software programs cannot be achieved.

Therefore, there is a need in the art for a method and apparatus for generating collective intelligence to recommend a resource for improving a computer.

SUMMARY OF THE INVENTION

Embodiments of the present invention comprise a method and apparatus for generating collective intelligence in order to automate resource recommendations for improving a computer. In one embodiment, a method for generating collective intelligence in order to recommend a resource for improving a computer is disclosed. In one embodiment, the method for generating, using at least one processor, collective intelligence in memory in order to recommend a resource for improving a computer comprises accessing configuration data associated with various resources at a plurality of computers, identifying usage patterns, based on the configuration data, associated with the various resources, wherein the identified usage patterns indicate at least one related resource for at least one resource of the various resources and determining a resource of the at least one related resource to utilize at a computer based on the identified usage patterns.

In some embodiments, a collective intelligence database may be populated using the identified usage patterns. In some embodiments, collective intelligence database defines a frequency, a type, related software information and related hardware information for each resource of the various resources. In some embodiments, a query for the collective intelligence database and a response to the query may be communicated through a website. In some embodiments, at least one of installing or configuring the at least one of the software program or the hardware device on the computer may be automatically performed.

In some embodiments, the identified usage patterns may be transformed into recommendation information indicating at least one of a software program or a hardware device to install at the computer. In some embodiments, recommendation information indicating at least one of at least one software program or at least one hardware device to install at the computer may be communicated. In some embodiments, for at least one resource type, at least one of a popular software program or a popular hardware device may be identified. In some embodiments, the related software information and the related hardware information may define a standard configuration for the each resource of the various resources.

In another embodiment, an apparatus for generating collective intelligence in order to recommend a resource for improving a computer is provided. The apparatus includes means for aggregating configuration data associated with various resources at a plurality of computers, means for identifying usage patterns from the aggregated configuration data, means for populating a collective intelligence database comprising the identified usage patterns, means for examining the identified usage patterns to determine at least one related resource for at least one resource of the various resources and means for identifying at least one resource to utilize at a computer.

In some embodiments, the apparatus further includes means for the transforming the identified usage patterns into recommendation information indicating at least one of a software program or a hardware device to install at the computer. In some embodiments, the apparatus further includes means for communicating recommendation information indicating, for at least one resource type, at least one of at least one popular software program or at least one popular hardware device. In some embodiments, the collective intelligence database defines a frequency, a type, related software information and related hardware information for each resource of the various resources. In some embodiments, the apparatus further includes means for automatically performing at least one of installing the software program or configuring the hardware device at the computer.

In a yet another embodiment, a computer-readable-storage medium is provided. The computer-readable-storage medium comprises one or more processor-executable instructions that, when executed by at least one processor, causes the at least one processor to aggregate configuration data associated with various resources at a plurality of computers, examine the aggregated configuration data to identify usage patterns associated with the various resources and populate a collective intelligence database comprising identified usage patterns.

In some embodiments, the one or more processor-executable instructions may transform the configuration data into the collective intelligence database. In some embodiments, the one or more processor-executable instructions may process a query associated with at least one resource at a computer. In some embodiments, the one or more processor-executable instructions may communicate a response to the query indicating at least one related resource. In some embodiments, the one or more processor-executable instructions may indicate at least one of a software program or a hardware device to install at a computer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

As explained in detail further below, various embodiments of the present disclosure enable computer system performance and stability improvement using collective intelligence. In some embodiments, an agent at each computer of a plurality of computers communicates configuration data regarding a plurality of resources (e.g., software programs and/or hardware devices). In some embodiments, a collection module aggregates the configuration data from the plurality of computers and identifies one or more usage patterns between the plurality of resources. Based on these usage patterns, the collection module determines one or more resources that are related to various ones of the plurality of resources. These related resources may be utilized at the plurality of computers. In some embodiments, an advisor module identifies a particular resource of the one or more related resources to utilize at a computer in order to improve performance and stability. For example, the advisor module may identify a related software program to install and/or a related hardware device to configure at the computer as explained further below.

In some embodiments, the collection module populates a collective intelligence database that indicates the one or more related resources (e.g., a related software program and/or a related hardware program) for each of the plurality of resources. In some embodiments, an advisor module examines the identified usage patterns and determines a resource to utilize at a computer based on the identified usage patterns in order to improve performance and stability. In some embodiments, the advisor module utilizes the collective intelligence database to recommend one or more popular hardware devices and/or one or more popular software programs that are associated with a particular resource type (e.g., operating systems).

Figure 1:
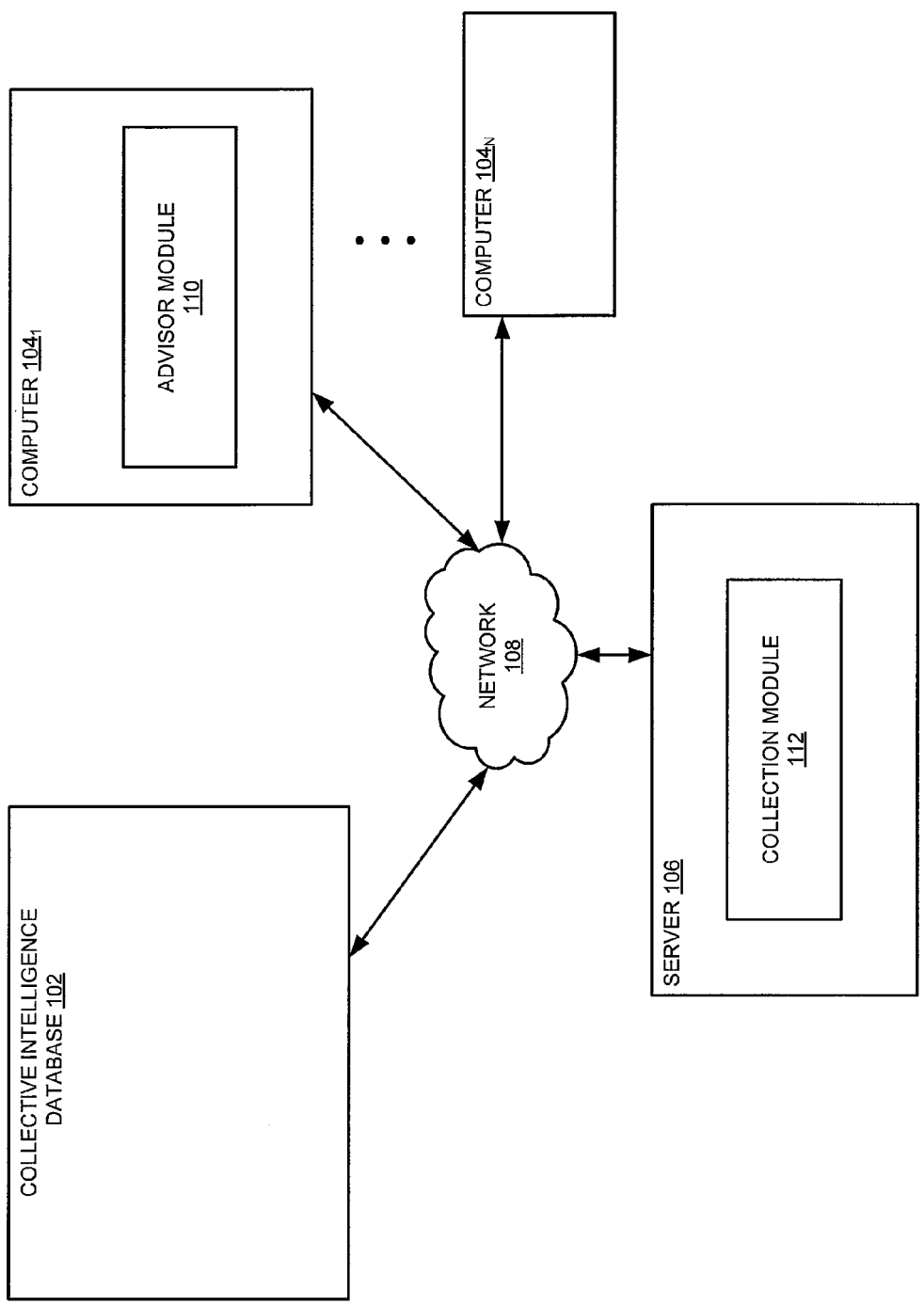
FIG. 1 is a block diagram of a system for generating collective intelligence to recommend a resource for improving a computer according to one or more embodiments.

FIG. 1 is a block diagram of a system 100 for generating collective intelligence to recommend a resource for improving a computer 104 according to one embodiment. The system 100 may form a computing environment that comprises a collection intelligence database 102, the plurality of computers 104 and a server 106, where each is coupled to one another through a network 108.

Generally, each of the plurality of computers 104 may be a type of computing device (e.g., a laptop, a desktop, a handheld computer, a terminal and/or the like) known to one of ordinary skill in the art having the benefit of this disclosure. In some embodiments, the each of the plurality of computers 104 may include an advisor module 110. In some embodiments, the advisor module 110 may use the collective intelligence database 102 to recommend a resource (e.g., hardware device and/or software program) for improving performance and stability of the plurality of computers 104 as explained further below.

In some embodiments, the plurality of computers 104 may include one or more physical machines as well as one or more virtual machines. In some embodiments, a backend networked-computer system may host the one or more virtual machines and provide various computer data services (e.g., application services, network services, storage services and/or the like) to remote computer users (i.e., cloud computing). This backend networked-computer system may include various hardware devices and software programs for mounting virtual machine images and operating virtual machines that interact with the remote computer users. The backend networked-computer system may communicate computer data to one or more terminals for display. Because the virtual machines represent actual physical machines, the advisor module 110 may utilize the collective intelligence database 102 to recommend a resource (e.g., a hardware device and/or a software program) for improving performance and stability.

The network 108 comprises a communication system that connects computers by wire, cable, fiber optic and/or wireless link facilitated by various types of well-known network elements, such as hubs, switches, routers, and the like. The network 108 may employ various well-known protocols to communicate information amongst the network resources. For example, the network 108 may be a part of the Internet or Intranet using various communications infrastructure such as Ethernet, WiFi, WiMax, General Packet Radio Service (GPRS), and the like.

The server 106 may be a type of computing device (e.g., a laptop, a desktop and/or the like) known to one of ordinary skill in the art having the benefit of this disclosure. The server 106 generally provides various services (e.g., application services, storage services and/or the like) to the plurality of computers 104 as well as various computer resources throughout the system 100. The server 106 includes a collection module 112.

The advisor module 110 examines one or more records of the collective intelligence database 102 in order to recommend one or more hardware devices and/or software programs to install and/or configure at the computer 104 according to various embodiments. For example, a user may desire to install a disk cloning or imaging software product, such as Norton Ghost from SYMANTEC. The advisor module 110 examines various requirements associated with an installation of the Norton Ghost. Then, the advisor module 110 determines an optimal configuration for the installation of the Norton Ghost. In some embodiments, the advisor module 110 uses the collective intelligence database 102 to identify software programs and/or hardware devices that are related to the Norton Ghost as explained further below.

In some embodiments, the advisor module 110 may automatically provide information recommending hardware devices and/or software programs to utilize at the computer 104. For example, the recommended hardware devices and/or software programs may be utilized immediately after certain operations by the user, such as the installation of the Norton Ghost as explained in the present disclosure. In some embodiments, the advisor module 110 may be authorized to automatically install and/or configure the recommended hardware device and/or software program. The advisor module 110, on the other hand, may also function at the direction of the user. For example, the user may operate the advisor module 110 and examine the collective intelligence database 102 in order to identify the hardware device and/or the software program to utilize at the computer 104.

The collection module 112 accesses and aggregates configuration data from each of the plurality of the computers 104. According to one or more embodiments, the configuration data may include various forms of information associated with one or more hardware devices and/or software programs, such as resource types, identifiers, parameters and/or the like. The collection module 112 may compute frequencies that reflect the distribution of the hardware devices and/or the software programs amongst the plurality of computers 104. Subsequently, the collection module 112 may communicate one or more records maintained in the collective intelligence database 102 in response to a query communicated by the advisor module 110.

In some embodiments, the collection module 112 may maintain a website through which queries on the collective intelligence database 102 and responses comprising matching records are exchanged. For example, a user may periodically submit the configuration data to the collection module 112 by using an Internet Protocol (IP) address associated with the server 106. As another example, the user may also submit a query for a number of popular software programs within a specific type (e.g., top twenty anti-virus software programs). Through the website, the collection module 112 may also publish each and every record of the collective intelligence database 102 in a web readable format (e.g., HTML, XML and/or the like) according to some embodiments. The user may browse the website in order to search these records instead of submitting queries. Furthermore, the collection module 112 may control access to the collective intelligence database 102 using a login/password authentication mechanism where each user creates an account and pays various fees (e.g., subscription charges, download fees and/or the like).

Figure 2:
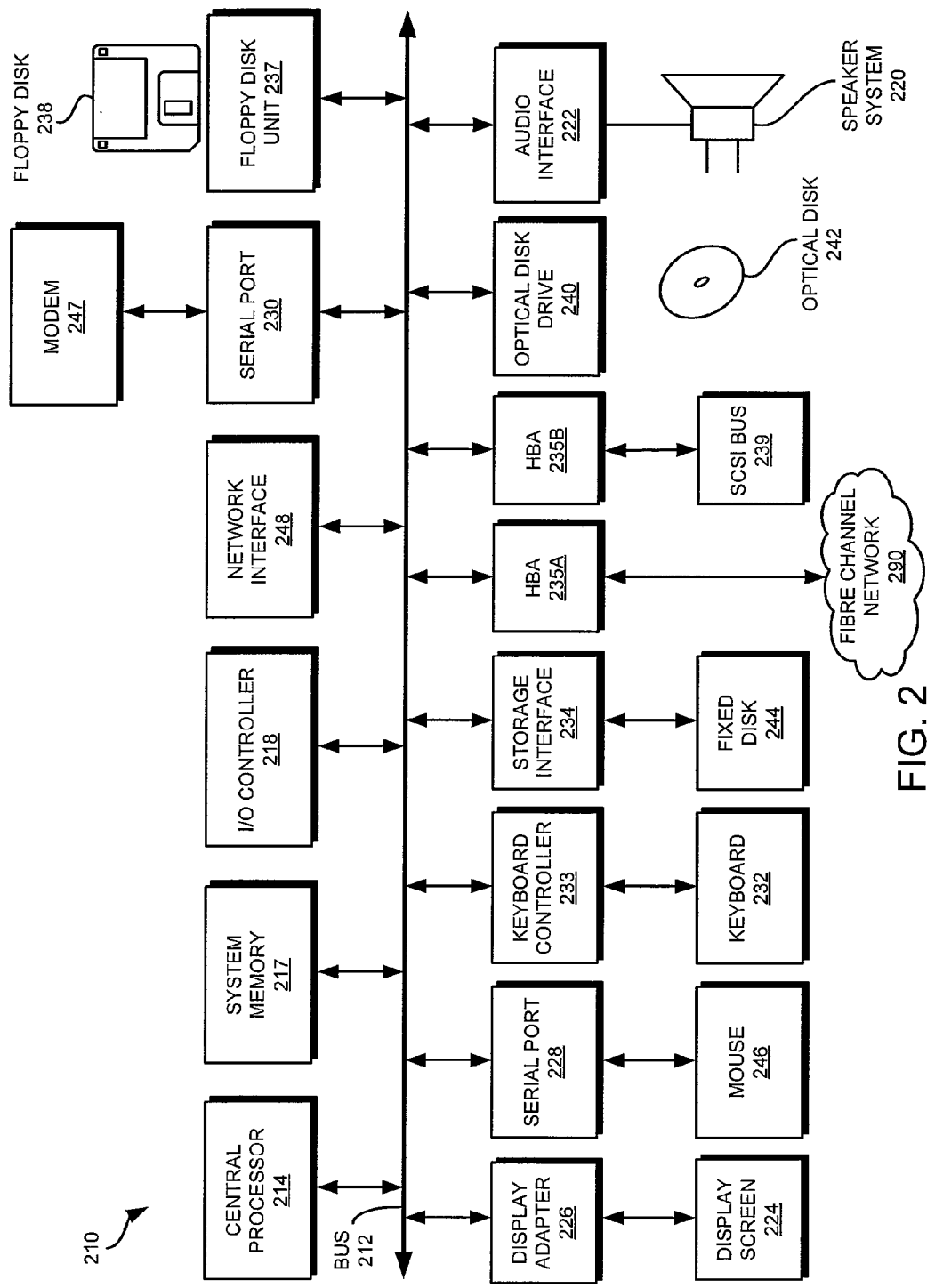
FIG. 2 is a block diagram of a suitable computer for implementing the present disclosure according to one or more embodiments.

FIG. 2 is a block diagram of a computer system 210 suitable for implementing the present disclosure. This system 210 is representative of a computer system that can be used to implement the computer 104 and/or the server 106 of FIG. 1. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212). In some embodiments, the computer system 210 may be an online gaming console.

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral devices. Applications resident with computer system 210 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of system memory 217, fixed disk 244, optical disk 242, or floppy disk 238. The operating system provided on computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
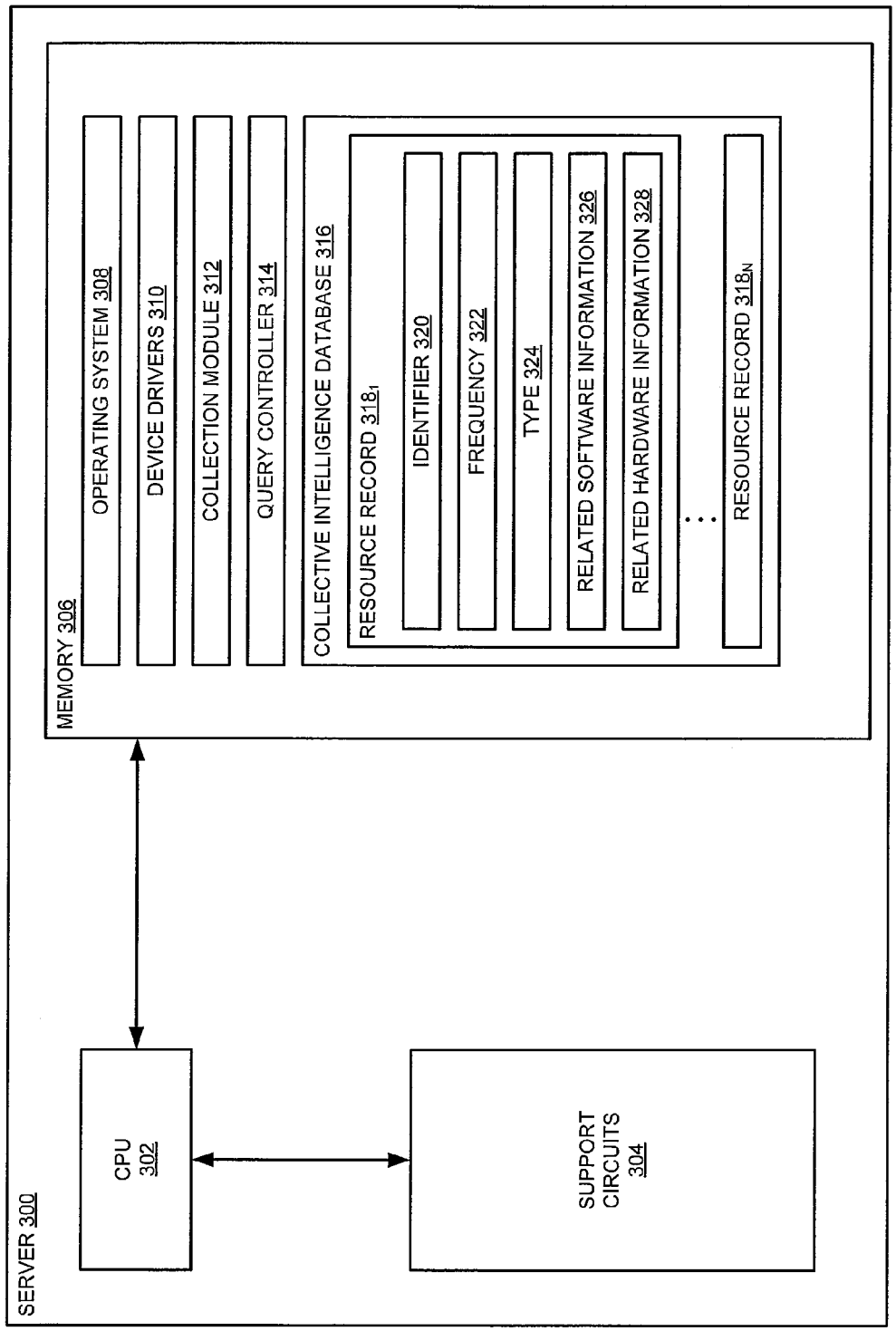
FIG. 3 is a block diagram of a server for generating a collective intelligence database for improving a computer according to one or more embodiments.

FIG. 3 is a block diagram of a server 300 for generating a collective intelligence database 316 in order to recommend a resource for improving a computer according to one or more embodiments.

The server 300 is a type of computing device (e.g., a laptop, a desktop and/or the like) that comprises a Central Processing Unit (CPU) 302, various support circuits 304 and a memory 306. The CPU 302 may comprise one or more commercially available microprocessors or microcontrollers that facilitate data processing and storage. Various support circuits 304 facilitate operation of the CPU 302 and may include clock circuits, buses, power supplies, input/output circuits and/or the like. The memory 306 includes a read only memory, random access memory, disk drive storage, optical storage, removable storage, and the like. The memory 306 includes various data and software packages, such as an operating system, 308, device drivers 310, a collection module 312, a query controller 314 and a collective intelligence database 316.

The operating system 308 generally manages various computer resources (e.g., network resources, data storage resources, file system resources and/or the like). The operating system 308 is configured to execute operations on one or more hardware and/or software devices, such as Network Interface Cards (NICs), hard disks, virtualization layers, firewalls and/or the like. For example, the various software packages call commands associated with the operating system 308 (i.e., native operating system commands) to perform various file system and/or storage operations, such as creating files or metadata, writing data to the files, reading data from the files, modifying metadata associated with the files and/or the like. The operating system 308 may call one or more functions associated with the device drivers 310 to execute various file system and/or storage operations. As an example, the operating system 308 may utilize a device driver associated with a NIC card to communicate data to another computer as explained further below.

The collection module 312 includes software code (e.g., processor executable instructions) that is executed by the CPU 302 to access configuration data associated with one or more resources (e.g., hardware devices, software programs and/or the like) from a plurality of computers (e.g., the plurality of computers 104 of FIG. 1). In one embodiment, the collection module 312 aggregates the configuration data and identifies one or more usage patterns between the one or more resources. For each resource, the collection module 312 determines one or more related software programs and/or hardware devices based on the identified usage patterns according to one or more embodiments.

For example, users who frequent online gaming websites may also utilize a particular computer graphics hardware configuration (e.g., a video adaptor, a graphics controller and/or the like) that implements advanced computer graphic functions. Furthermore, these users may utilize a certain computer network connection configuration (e.g., a network adapter, an Internet service provider type and/or the like) that provides high data transfer rates. These users may also employ one or more specific web browser configuration parameters that enable optimal online gaming performance. These users may also utilize an anti-virus software product that prevents manipulation of saved gamed information (e.g., scores) by malicious software. As another example, a significant number of computers may allocate three GB of hard disk storage space for a Norton Ghost installation. As yet another example, a significant number of users installed Norton Internet Security (NIS) in addition to installation of Internet Explorer (IE).

In some embodiments, the collection module 312 populates the collective intelligence database 316. The collective intelligence database 316 includes a plurality of resource records 318 according to various embodiments. Each of the plurality of the resource records 318 includes various attributes associated with a particular resource, such as an identifier 320, a frequency 322, a type 324, related software information 326 and related hardware information 328. In some embodiments, the identifier 320 may be an attribute that uniquely references the particular resource (e.g., a hardware device and/or a software program). In one or more embodiments, the identifier 320 may include a vendor, a name, version number and/or the like. Similarly, the type 324 indicates a category for the particular resource. In some embodiments, the frequency 322 may include a value that represents a popularity and/or penetration of the associated resource amongst a plurality of computers (e.g., the plurality of computers 104 of FIG. 1). For example, a frequency for a certain hardware device may indicate an approximate number of users who have installed and/or configured the certain hardware device.

In some embodiments, the related software information 326 indicates one or more software programs that may be installed by a significant number of users that also operate a particular software program and/or a hardware device. In some embodiments, the one or more software programs may cooperate with the particular software program. For example, computers that include Internet Explorer (IE) also include installations of Norton Internet Security (NIS) and a firewall program as well. The related software information 326 may include versions of the NIS as well as the firewall program. As another example, users that operate ADOBE Photoshop may most likely also operate Corel Draw and Paint Shop Pro.

In some embodiments, the related hardware information 328 indicates one or more hardware devices that may be configured on a significant number of computers that also operate the particular software program and/or the hardware device. For example, certain users may configure three GB of working memory (i.e. RAM) to install MICROSOFT Vista operating system. As such, the related hardware information 328 may indicate that three GB RAM is desirable for optimal configuration and/or installation of MICROSOFT Vista operating system.

In some embodiments, the collection module 312 may define a configuration standard (e.g., gold standard) for a particular resource. The related software information 326 and the related hardware information 328 within the collective intelligence database 316 may form a configuration standard for the particular resource. For example, a particular operating system may be correlated with a certain hard disk size (e.g., five GB) as well as one or more security software programs (e.g., SYMANTEC Norton Anti-virus). In some embodiments, the configuration standard also reflects various best practices regarding computer security, performance and stability. For instance, even though a significant number of computer users do not utilize an anti-virus software program of any kind, the related software information 326 may still indicate one or more anti-virus software programs to install in order to prevent system failures caused by malicious software code.

In some embodiments, an advisor module (e.g., the advisor module 110 of FIG. 1) may examine the related software information 326 and/or the related hardware information 328 in order to determine one or more resources to utilize at a computer as explained further below. In some embodiments, the advisor module may identify one or more software programs and/or hardware devices to install and/or configure at the computer. For example, the advisor module may determine that computers having a particular software program (e.g., SYMANTEC Norton Ghost) perform optimally with two GB of hard disk space.

The query controller 314 includes software code (e.g., processor executable instructions) that is executed by the CPU 302 to process the one or more requests. As soon as the query controller 314 receives a request (e.g., a query) from an advisor module (e.g., the advisor module 110 of FIG. 1), the query controller 314 processes each and every embedded database command according to some embodiments. In one embodiment, the query controller 314 accesses the collective intelligence database to retrieve one or more resource records that correspond with the each and every embedded database command of the resource records 318.

Subsequently, the query controller 314 communicates a response to the advisor module. For example, the query controller 314 may process a request for one or more related resources for a particular operating system. The query controller 314 generates a response that indicates an amount of computer memory (e.g., four GB of RAM) as well as an anti-virus software program (e.g., SYMANTEC Norton) to install. As another example, the query controller 314 may process a request for one or more popular resources based on the frequencies 322. For example, the response may indicate one or more operating systems in order of popularity, such as MICROSOFT XP, MICROSOFT Vista, APPLE Mac OS and/or the like.

Figure 4:
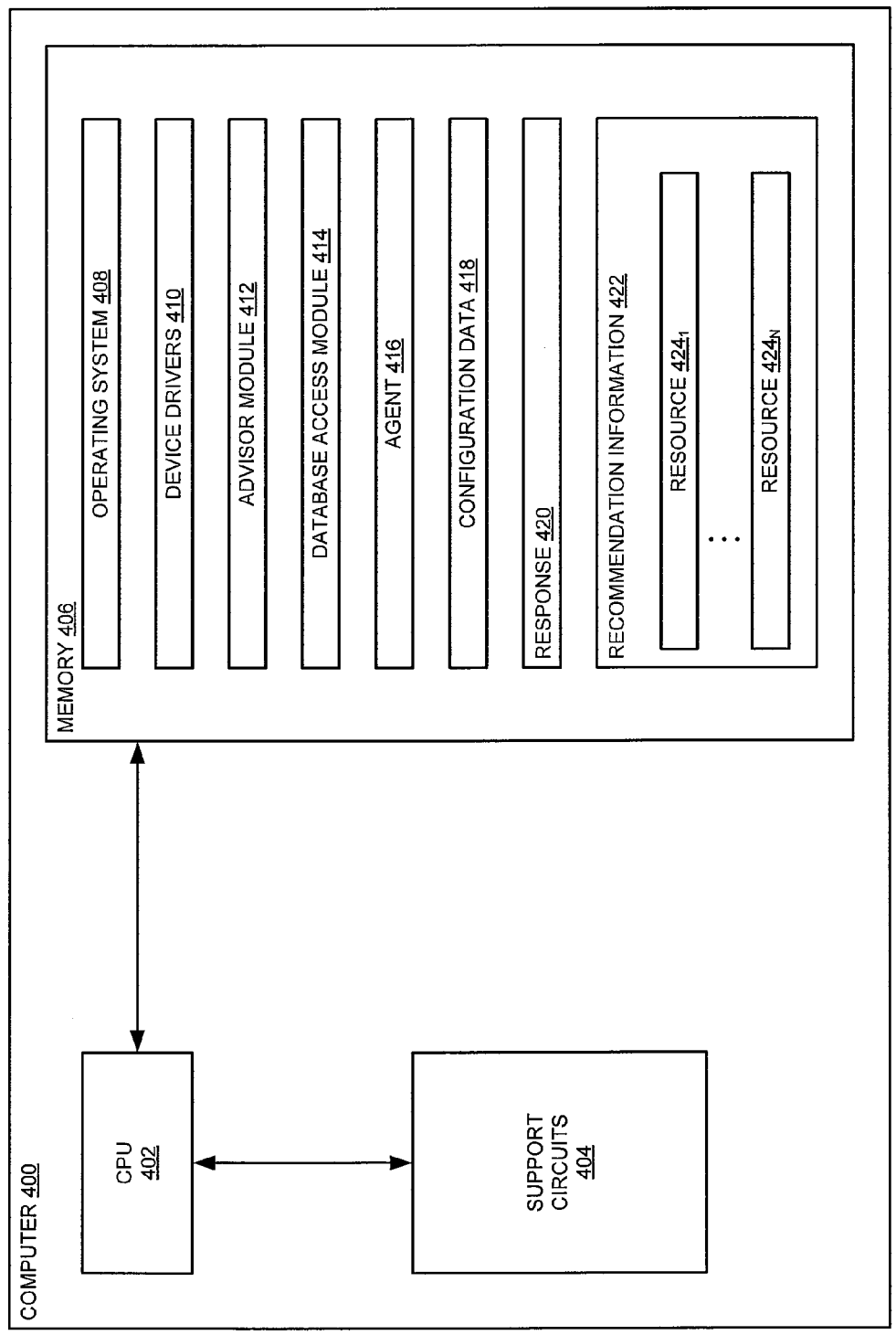
FIG. 4 is a block diagram of a computer for identifying one or more resource to utilize in order to improve stability and performance according to one or more embodiments.

FIG. 4 is a block diagram of a computer 400 for identifying one or more resources to utilize in order to improve stability and performance according to one or more embodiments.

The client 400 is a type of computing device (e.g., a laptop, a desktop and/or the like) that comprises a Central Processing Unit (CPU) 402, various support circuits 404 and a memory 406. The CPU 402 may comprise one or more commercially available microprocessors or microcontrollers that facilitate data processing and storage. Various support circuits 404 facilitate operation of the CPU 402 and may include clock circuits, buses, power supplies, input/output circuits and/or the like. The memory 406 includes a Read Only Memory, Random Access Memory, disk drive storage, optical storage, removable storage, and the like. The memory 406 includes various data and software packages, such as an operating system 408, device drivers 410, an advisor module 412, database access module 414, an agent 416, configuration data 418 and a response 420.

The operating system 408 generally manages various computer resources (e.g., network resources, data storage resources, file system resources and/or the like). The operating system 408 is configured to execute operations on one or more hardware and/or software devices, such as Network Interface Cards (NICs), hard disks, virtualization layers, firewalls and/or the like. For example, the various software packages call commands associated with the operating system 408 (i.e., native operating system commands) to perform various file system and/or storage operations, such as creating files or metadata, writing data to the files, reading data from the files, modifying metadata associated with the files and/or the like. The operating system 408 may call one or more functions associated with the device drivers 410 to execute various file system and/or storage operations. As an example, the operating system 408 may utilize a device driver associated with a NIC card to communicate data to another computer as explained further below.

The agent 416 may include software code (e.g., processor executable instructions) that is executed by the CPU 402 to generate the configuration data 418. The configuration data 418 is associated with one or more resources (e.g., hardware devices, software programs and/or the like) that may be available on the computer 400. According to various embodiments, the configuration data 418 may indicate a resource identifier, a resource type, various operational parameters associated with a software program and/or a hardware device and/or the like. For example, the configuration data 418 may indicate a size of a hard disk, a zone assigned to a LUN, a number of hard disks in a storage array and/or an IP address assigned to a NIC device. As another example, the configuration data 418 may indicate version information associated with an operating system (e.g., MICROSOFT Vista), a database application, a virtualization technology (e.g., VMWARE Virtual Machine Disk (VMDK) for VMWARE Workstation), a high availability cluster software implementation (e.g., VERITAS Cluster Server (VCS)) and/or a security system (e.g., anti-virus software programs, such as SYMANTEC Norton). The agent 416 communicates the configuration data 418 to a collection module (e.g., the collection module 112 of FIG. 1 and collection module 316 of FIG. 3).

According to various embodiments, the advisor module 412 includes software code (e.g., processor executable instructions) that is executed by the CPU 402. The advisor module 412 may cooperate with the database access module 414 to communicate a request (e.g., a query) to a query controller (e.g., the query controller 314 of FIG. 3). The database access module 414 may include software code (e.g., processor executable instructions) that is configured to facilitate access to a collective intelligence database (e.g., the collective intelligence database 102 of FIG. 1 and the collective intelligence database 316 of FIG. 3). The request may include various attributes embedded within one or more database commands (e.g., Structured Query Language (SQL) commands). In accordance with the one or more database commands, the query controller retrieves portions of one or more records that match the various attributes. Then, the query controller communicates the response 420 including the retrieved portions, such as related software information (e.g., the related software information 326 of FIG. 3) and/or related hardware information (e.g., the related software information 328 of FIG. 3).

The advisor module 412 processes the response 420 to examine the related software information and the related hardware information associated with a particular resource. According to various embodiments, the advisor module 412 determines one or more resources 424 (e.g., software programs and/or hardware devices) to utilize at the computer and generates the recommendation information 422 to indicate the resources 424. In some embodiments, the one or more resources 424 may include one or more related resources for the particular resource. Each of the related resources 424 may include a software program and/or a hardware device that may be installed and/or configured at the computer 400. Alternatively, for one or more resource types available on the computer 400, the response 420 may indicate one or more popular software programs and/or one or more popular hardware devices.

The advisor module 412 processes the recommendation information 422 to automatically install the one or more software program on the computer 400. After the user installs the hardware device, the advisor module 412 may automatically configure the hardware device for operation at the computer 400 according to some embodiments. In some embodiments, the advisor module 412 may configure the hardware device to operate optimally in accordance with a standard configuration as defined by the resources 424. As an example, the advisor module 412 may recommend that the user install three GB of memory before installing a copy of Norton Ghost for optimal performance.

In one embodiment, the advisor module 412 may recommend the related resource when the user uninstalls the one or more resource. For example, the user may uninstall an image capturing software. The advisor module 412 may recommend that the user also uninstall any image editing software. Alternatively, the user may uninstall the image editing software. The advisor module 412 may inform the user that since the image capturing software is installed, image editing software should also be installed on the client 400.

Figure 5:
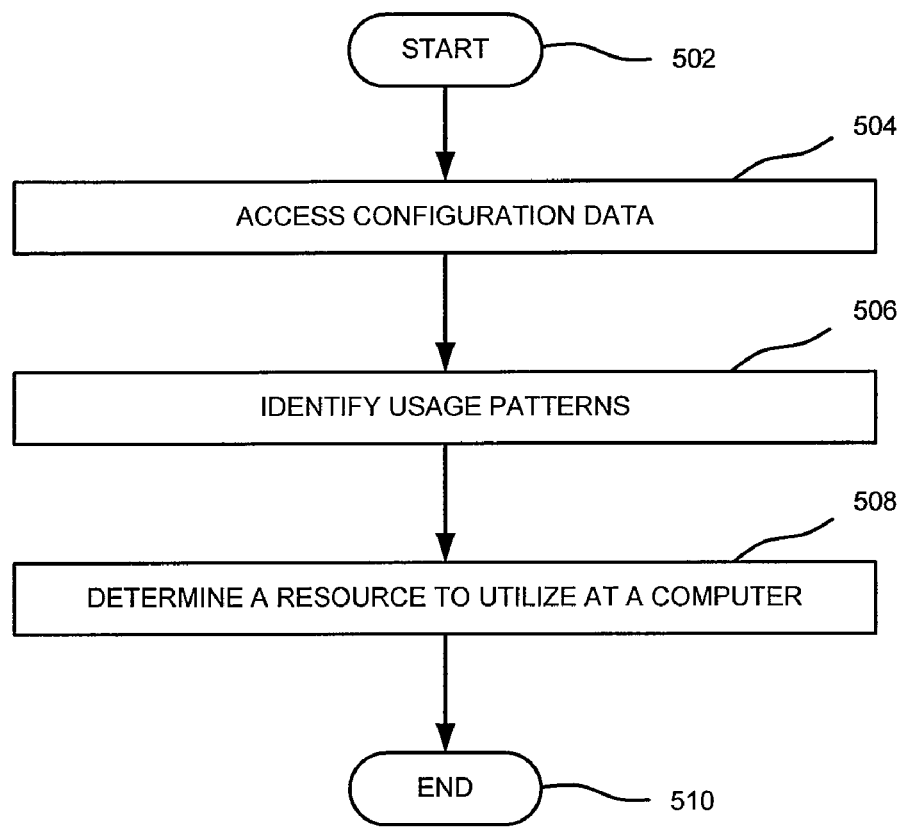
FIG. 5 is a flow diagram of a method for generating collective intelligence in order to recommend a resource for improving a computer according to one or more embodiments.

FIG. 5 is a flow diagram of a method 500 for generating a collective intelligence database in order to recommend a resource for improving a computer according to one or more embodiments. The method 500 starts at step 502 and proceeds to step 504.

At step 504, the configuration data is accessed. In some embodiments, an agent (e.g., the agent 416 of FIG. 4) is executed by one or more processors to generate the configuration data. In some embodiments, a collection module (e.g., the collection module 112 of FIG. 1 and the collection module 312 of FIG. 3) is executed by one or more processors to aggregate the configuration data from a plurality of computers (e.g., the plurality of computers 104 of FIG. 1) as explained in the present disclosure. Once the configuration data is aggregated, various software modules may cooperate to transform the configuration data into recommendation information as explained further below.

At step 506, one or more usage patterns are identified between various resources that are utilized at the plurality of computers. In some embodiments, the collection module may identify these usage patterns and create a collective intelligence database (e.g., the collective intelligence database 102 of FIG. 1 and the collective intelligence database 316 of FIG. 3). These usage patterns may indicate one or more related resources (e.g., related software programs and/or related hardware devices) for each resource of the various resources. Such a collective intelligence database may be stored on a server (e.g., the server 300 of FIG. 3).

At step 508, a resource to utilize at a computer is determined. In some embodiments, an advisor module (e.g., the advisor module 110 if FIG. 1 and the advisor module 412 of FIG. 4) cooperates with a database access module (e.g., the database access module 414 of FIG. 4) to communicate a request (e.g., a query) to a query controller (e.g., the query controller 314 of FIG. 3). The advisor module may utilize a query language such as, including but not limiting to, Structured Query Language (SQL) and/or the like to communicate the request. For example, the advisor module may communicate the request for related software information and/or related hardware information associated with one or more resources that are installed and/or configured on the computer.

As soon as the query controller receives the request, the query controller processes the query and retrieves the related software information and/or the related hardware information from the collective intelligence database. The query controller communicates such desired information to the advisor module. In some embodiments, the advisor module examines the related software information and/or the related hardware information and identifies one or more resources (e.g., software programs and/or hardware devices) to utilize at the computer. The advisor module stores information associated with the identified one or more resources as recommendation information. For example, the advisor module may determine that installing an anti-virus software program may most likely improve the stability and performance of the computer. In some embodiments, the advisor module may automatically install the anti-virus software program.

As another example, If the advisor module determines that a significant number of user utilize five GB of hard disk space but the computer only utilizes three GB, then adding two GB of hard disk space may most likely improve the stability and performance. In some embodiments, the advisor module may automatically configure the computer with two GB of additional hard disk space. For instance, the advisor module may assign a LUN having at least two GB to the computer. The advisor module may create a partition for the LUN and/or adjust an existing partition to include the LUN.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:
1. A method, using at least one processor, comprising:
   accessing configuration data associated with a first resource, wherein
      the configuration data is aggregated from a plurality of computers;
   identifying usage patterns, based on the configuration data, associated with the first resource, wherein
      the usage patterns indicate at least one resource related to the first resource; and
   identifying a second resource to utilize at a computer based on the identified usage patterns, wherein
      the second resource is identified from a set that comprises the at least one resource related to the first resource, and
      the first resource is utilized at the computer.
2. The method of claim 1, wherein the identifying the usage patterns further comprises:
   populating a collective intelligence database using the usage patterns.
3. The method of claim 2, further comprising:
   communicating a query for the collective intelligence database and a response to the query through a website.

4. The method of claim 2, wherein the collective intelligence database comprises a frequency, a type, related software information, and related hardware information for the first resource.

5. The method of claim 4, wherein the related software information and the related hardware information define a standard configuration for the first resource.

6. The method of claim 1, further comprising:
communicating recommendation information indicating at least one of a software program or a hardware device to install at the computer.

7. The method of claim 6, further comprising:
automatically performing at least one of installing or configuring the at least one of the software program or the hardware device on the computer.

8. The method of claim 1, wherein the identifying the usage patterns further comprises:
identifying, for at least one resource type, at least one of a software program or a hardware device used by the plurality of computers with the highest frequency.

9. The method of claim 1, wherein the identifying the second resource further comprises:
transforming the usage patterns into recommendation information indicating at least one of a software program or a hardware device to install at the computer.

10. An apparatus, using at least one processor, comprising:
means for aggregating configuration data associated with a first resource, wherein
the configuration data is aggregated from a plurality of computers;
means for identifying usage patterns associated with the first resource, based on the configuration data, wherein
the usage patterns indicate at least one resource related to the first resource;
means for populating a collective intelligence database comprising the usage patterns; and
means for identifying a second resource to utilize at a computer by examining the usage patterns, wherein
the second resource is identified from a set that comprises the at least one resource related to the first resource, and
the first resource is utilized at the computer.

11. The apparatus of claim 10, further comprising:
means for transforming the usage patterns into recommendation information indicating at least one of a software program or a hardware device to install at the computer.

12. The apparatus of claim 11, further comprising:
means for automatically performing at least one of installing the software program or configuring the hardware device at the computer.

13. The apparatus of claim 10, further comprising:
means for communicating recommendation information indicating, for at least one resource type, at least one software program or at least one hardware device used by the plurality of computers with the highest frequency.

14. The apparatus of claim 10, wherein the collective intelligence database defines a frequency, a type, related software information, and related hardware information for the first resource.

15. A computer-readable-storage medium comprising one or more processor-executable instructions that, when executed by at least one processor, causes the at least one processor to:
aggregate configuration data associated with a first resource, wherein
the configuration data is aggregated from a plurality of computers;
examine the configuration data to identify usage patterns associated with the first resource, wherein
the usage patterns indicate at least one resource related to the first resource;
populate a collective intelligence database using the usage patterns;
and
identify a second resource to utilize at a computer, wherein
the second resource is identified from a set that comprises the at least one resource related to the first resource, and
the first resource is utilized at the computer.

16. The computer-readable-storage medium of claim 15 further comprising one or more processor-executable instructions that, when executed by the at least one processor, causes the at least one processor to:
identify, for the first resource, at least one of a related software program or a related hardware device.

17. The computer-readable-storage medium of claim 15 further comprising one or more processor-executable instructions that, when executed by the at least one processor, causes the at least one processor to:
transform the usage patterns into recommendation information indicating at least one of a software program or a hardware device to utilize at the computer.

18. The computer-readable-storage medium of claim 17 further comprising one or more processor-executable instructions that, when executed by the at least one processor, causes the at least one processor to:
automatically perform at least one of installing the software program or configuring the hardware device at the computer.

19. The computer-readable-storage medium of claim 15 further comprising one or more processor-executable instructions that, when executed by the at least one processor, causes the at least one processor to:
process a query associated with the first resource at the computer; and
communicate a response comprising the recommendation information.

20. The computer-readable-storage medium of claim 15 further comprising one or more processor-executable instructions that, when executed by the at least one processor, causes the at least one processor to:
identify, for at least one resource type, at least one of a software program or a hardware device used by the plurality of computers with the highest frequency.

* * * * *